Feb. 7, 1961 W. G. GIBSON 2,971,053

VIDEO SIGNAL COMPENSATING CIRCUITS

Filed June 13, 1956

INVENTOR.
Walter G. Gibson
BY
[signature]
ATTORNEY 2,971,053
Patented Feb. 7, 1961

2,971,053

VIDEO SIGNAL COMPENSATING CIRCUITS

Walter Gold Gibson, Princeton, N.J., assignor to Radio Corporation of America, a corporation of Delaware Filed June 13, 1956, Ser. No. 591,205

10 Claims. (Cl. 178—7.1)

The invention relates to television systems, and it particularly pertains to improved circuit arrangements for compensating for loss of detail due to the finite dimensions of scanning electron beams and/or the leakage over the target electrodes, and/or for optical aberrations in such systems.

Due to the finite dimensions of the image signal producing and image reproducing electron beam spots there is appreciable loss of detail in image reproduction by the electronic television scanning process. In particular, because the scanning spot is of finite size, the light intensity over an appreciable area of the image is averaged so that all fine detail within this area is effectively suppressed. Thus the television system acts as though it were an ideal system with low pass filtering of the finer detail, or the higher frequency components by which that detail is conveyed. Since there are two scanning spots, one at the image signal producing end and one at the image reproducing end, the total filtering action in the overall system is the equivalent of two separate filters in tandem.

Electronic television image signal producing tubes also exhibit a "leakage" effect over the target electrode whereby image information of an elemental picture area is also picked up as a component of the image signal from nearby elemental areas. In a sense each elemental area affects every other elemental area of the target electrode to some degree; the effect being less as the distance is increased.

Accordingly, for good detail in the reproduced image, it is important to compensate for the filtering and leakage effects. In black-and-white television as used in entertainment broadcasting today, the image orthicon tube is almost universally used and almost universally operated "over the knee" of the characteristic curve representing the performance of the tube. This type of operation tends to produce good "edge effects" in the black-and-white signal whereby the loss of detail due to the finite size of the electron beam and leakage is less noticeable than it would otherwise be. In both black-and-white and color television systems using photo-conductive tubes, such as the vidicon, however, there is little or none of the "edge sensitivity" characteristic found in the image orthicon. Therefore it is especially desirable with vidicon tubes, and the like, to compensate for loss of detail due to leakage. In color television systems, edge sensitivity is not obtainable with the image orthicon either because it must be operated over a more linear portion of the characteristic curve for good color signals. Therefore it is even more advantageous in color television broadcasting to compensate for loss of detail due to the finite dimensions of the scanning spot, leakage and for aberrations of the optical system.

Arrangements have been developed for producing a video signal compensated for loss of detail due to the finite size of the scanning spot leakage and optical aberrations. Once such system is illustrated and described in the copending U.S. patent application Serial No. 525,-648 of Alda V. Bedford filed August 1, 1955, now U.S. Patent No. 2,757,236, issued July 31, 1956, which contains an excellent discussion of the basic problem. Arrangements are illustrated and described in the copending U.S. patent application Serial No. 587,360, filed on May 25, 1956, by Alfred C. Schroeder and Walter G. Gibson jointly for Video Signal Compensation, of which this application describes and represents an improvement.

In the copending application of Schroeder and Gibson, Serial No. 587,360, there are shown arrangements for producing a video signal symmetrically compensated by subtracting information from the line under consideration a predetermined portion of the information from the preceding and succeeding lines of the same field. In order to accomplish this, two delay lines are employed according to the invention represented by the copending application Serial No. 587,360.

While not a serious problem, the use of two delay lines is not particularly advantageous and further simplification of the arrangements is desirable.

An object of the invention is to provide an improved and simplified system for compensating for the loss of detail in electronic television systems.

Another object of the invention is to provide simplified circuitry for balanced compensation of a video signal for loss of detail due to the finite size of the scanning spot and leakage.

Fundamentally, the loss in detail in the vertical direction in an interlaced television system is minimized by effectively compensating the information derived from the scanning of each raster line with information derived from the scanning of raster lines preceding and succeeding the raster line under consideration and in the same field therewith. In a basic arrangement the compensation of the video signal is accomplished by delaying information obtained from the line previous to the line under consideration in the same field of the raster for a time substantially equal to the time required to scan two lines to form one secondary signal and by delaying the information obtained from the line under consideration for a time substantially equal to that required to scan one line to form the main signal. The delayed signals are then combined with the undelayed signal, forming the other secondary signal, in predetermined polarity and magnitude, to produce the desired compensated video signal in suitable form for controlling the operation of an image reproducing device. The necessary delays are introduced by connecting two delay devices in series to provide delay times of one and two times that required to scan one line.

According to the invention a single delay device is arranged to provide a delay of one line time for deriving the main signal and a portion of the main signal is returned to the input of the single delay device for deriving one of the secondary signals, while the other secondary signal is derived from the undelayed signal. More specifically, it is contemplated according to the invention, that there is in addition to the signal delaying means, apparatus for inverting, or reversing the polarity of one or more of the signals with respect to the other, or erect, signal and then attenuating or decreasing in magnitude the inverted signals to form secondary signals before combining with the erect, or main, signal.

The arrangements according to the invention are readily adaptable for minimizing the loss of detail in both the horizontal and vertical directions by means of simple low pass filtering means interposed in the circuitry for developing the secondary signals. The attenuation of the higher frequency components effected by the low pass filter, is in effect inverted when the secondary signals are effectively subtracted from the main signal due to the reversal by the inverting means.

It should be understood that apparatus according to the invention may be embodied in the transmitting or receiving apparatus with equal effect. In most cases, it is probably preferable to incorporate the invention in the transmitter since in this manner, the advantages of the invention accrue to the televiewer using existing receiving apparatus without requiring any changes therein.

In order that the invention may be readily put to use and the advantages thereof fully realized, several embodiments of the invention are described hereinafter, by way of examples only, with reference to the accompanying drawing in which.

Before describing the invention in detail, reference is made to the copending U.S. patent application, Serial No. 525,648, filed August 1, 1955, by Alda V. Bedford, now U.S. Patent No. 2,757,236, issued July 31, 1956, describing the manner in which vertical aperture loss arises in television systems.

Figure 1:
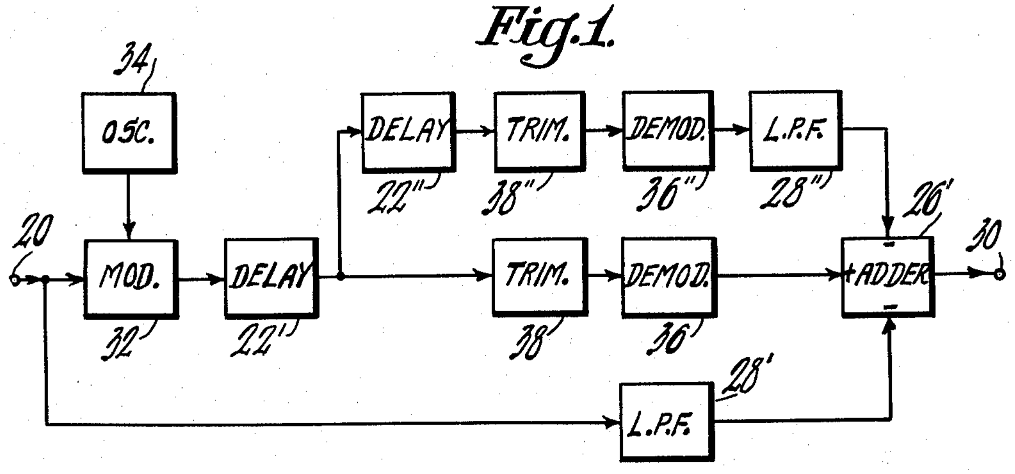
Figure 1 is a functional diagram of an arrangement shown and described in the copending U.S. patent application, Serial No. 587,360.

With the general nature of the problem in mind, reference is made to Figure 1 of the drawing showing the components of that part of a television system necessary to develop the compensated video signals in accordance with the fundamental principles set forth in the above mentioned copending U.S. patent application, Serial No. 587,360. Since the invention may be embodied in apparatus either at the transmitter or at one of the receivers, specific reference to either type of apparatus will be avoided. Video signals from a suitable source—such as a camera, or other pickup device, used at a transmitting station or the video signal demodulating portion of a television receiver, or other image reproducing apparatus—are applied at video signal input terminals 20. In any case, the video signals applied at the input terminals 20 are conventional and of the type which may be impressed upon an image reproducing device to form a raster having horizontal lines. A delay device 22′ is coupled to the input terminals 20 to form a main signal by delaying the video signals for a time period substantially equal to that required to scan one line of the raster. The character of the delay device, in so far as the broad aspects of the invention are concerned is immaterial. If desired, it may be formed of lumped inductive and capacitive reactance circuit elements to constitute a conventional delay network. It is only necessary that a delay, including any delay inherent in the remainder of the circuitry, of the order of 63.5 microseconds be obtained over a frequency range of zero to as high as four mc./s. under present standards without undue frequency discrimination.

A number of delay devices suitable for the purpose are known in the art, among which are magnetic tape and wire recording systems, lumped capacitance-inductance networks, mercury column, and the *graphechon* type of cathode ray tube described in the above identified copending application, Serial No. 525,648, or any other storage type tube. Another delay device suitable for the purpose is the quartz crystal storage and delay device which is advantageous in that it is compact despite the fact that it does require some, but relatively simple, auxiliary circuitry for operation.

The functional diagram of Figure 1 illustrates the use of a quartz crystal delay device 22′. The video signal appearing at the input terminals 20, which ranges in frequency from zero to four mc./s. is applied to a modulating circuit 32 to which a locally generated sine wave obtained from an oscillating circuit 34 is also applied to produce a signal of suitable frequency range for application to a crystal delay device. The quartz crystal delay device 22′ may be cut to provide a delay of exactly one line. However, in practice it is often desirable to cut the quartz crystal device 22′ to delay the signal for a time slightly less than that required to scan one horizontal line, say for 62.0 microseconds and additional delay of adjustable nature is obtained by interposing a trimming delay device 38 in the circuit. Since the maximum delay of the trimming delay device 38 need only be of the order of a few, say 1.5, microseconds, conventional inductance-capacitance networks are entirely suitable. The trimming delay device 38 may precede the demodulating circuit 36, as shown, or if desired the trimming delay device may follow the demodulating device 36. It should also be understood that it is entirely within the realm of possibility that the total delay of the quartz crystal delay device 22′ may be made adjustable over a final few microseconds' range. The delayed video signal is restored to the original frequency range of 0–4 mc./s. by means of a demodulating circuit 36, which may be of conventional form, to form the main signal representing the line of the raster under consideration. One secondary signal is obtained after an additional delay of one line provided by a further quartz crystal delay device 22″ having the input circuit thereof connected to the output circuit of the initial quartz crystal delay device 22′, a demodulating circuit 36″, and a trimming delay circuit 38″, and another secondary signal is obtained from the input terminals 20. The output of the demodulating circuit 36 is applied to one terminal of a combining, or algebraic adding, circuit 26′, and the further delayed and the undelayed secondary signals appearing at the input terminals 20 may be directly applied to other terminals of the combining circuit 26′. Essentially, the combining circuit 26′ comprises means for effectively subtracting a portion of the delayed secondary signal obtained from the additional delay device 22″ and a portion of the undelayed signal appearing at the input terminals 20 from the main signal obtained from the initial delay device 22′ to produce at the compensated video signal output terminals 30 a video signal compensated in the vertical direction.

It is contemplated that the combining circuit 26′ comprises components for attenuating the delayed video signal in a predetermined manner and for inverting the delayed video signal with respect to the erect video signal appearing at the input terminals 20. Suitable attenuating components are well known to those skilled in the art, as are suitable polarity reversing devices, such as conventional controlled electron flow path devices. The remainder of the combining device 26′ may comprise a combining circuit of the type embodied in conventional television transmitters for adding video, blanking and synchronizing signals. A schematic diagram showing circuitry for performing the functions outlined in Figure 1 may be found in the above mentioned copending U.S. patent application Serial No. 587,360. In the arrangement of Figure 1 as thus far described a portion of the information obtained at a given point in one line of a raster is subtracted from the information obtained at the corresponding point in the succeeding line of the same field of that raster from which a portion of the signal obtained from the succeeding line to be scanned in the same field is also subtracted, to produce at the output terminals 30 a modified video signal which is compensated suitably to overcome the loss of detail in the vertical direction due to the finite size of the scanning spot and/or to leakage.

To minimize the loss of detail in the horizontal direction, one low pass filter 28″ is interposed in series between the quartz crystal delay device 22′ and the combining circuit 26′ and a further low pass filter 28′ is connected between the input terminals 20 and the combining circuit 26′. The low pass filters effectively attenuate the higher frequency components of the delayed video signals and when the filtered secondary signals after appropriate attenuation are subtracted from the unfiltered main signal in the combining device 26', the high frequency components are effectively peaked. Peaking is effected by the increase in ratio of the high frequency components to the low frequency components brought about by subtracting the low frequency components from the signal in the combining device 26'.

The delay of one line is equivalent to peaking at an intermediate frequency of the video signal band. Although prior art teaching is to the effect that peaking is more important at the uppermost limits of the band, it has been found that better results are obtained with peaking beginning at much lower frequencies. Good results have been obtained in practice with peaking starting at very low frequencies, almost zero, and reaching substantially a maximum as low as one eighth of the highest frequency in the band and continuing substantially at that level for the remainder of the band. The low pass filter may be in conventional form comprising inductive and capacitive reactance elements. The cutoff frequency of the filters 28', and 28'' depends on the scene televised, the type of camera used, and/or the conditions under which a given scene is televised. It may be desirable that the compensating apparatus be equipped with filters arranged so that the cutoff frequency can be varied for optimum compensation.

The degree of compensation, or the attenuation of the secondary signal, may be determined approximately by mathematical analysis of some complexity once certain fundamental assumptions are determined. In practice, however, the apparatus under consideration, that is the image orthicon, vidicon, or other pickup device and/or associated equipment, is difficult to analyze for the fundamental assumptions. Therefore, a strictly empirical approach is both satisfactory and realistic. In practice, complete elimination of interfering effects is probably not possible and in some instances not even desirable. For example, it may be desirable to soften the image to some degree. Actually it is desirable to be able to change the degree of compensation with the scene to be televised, with the type of camera used, and with the conditions under which a given scene is televised with a given camera, and so on.

Figures 2, 3:
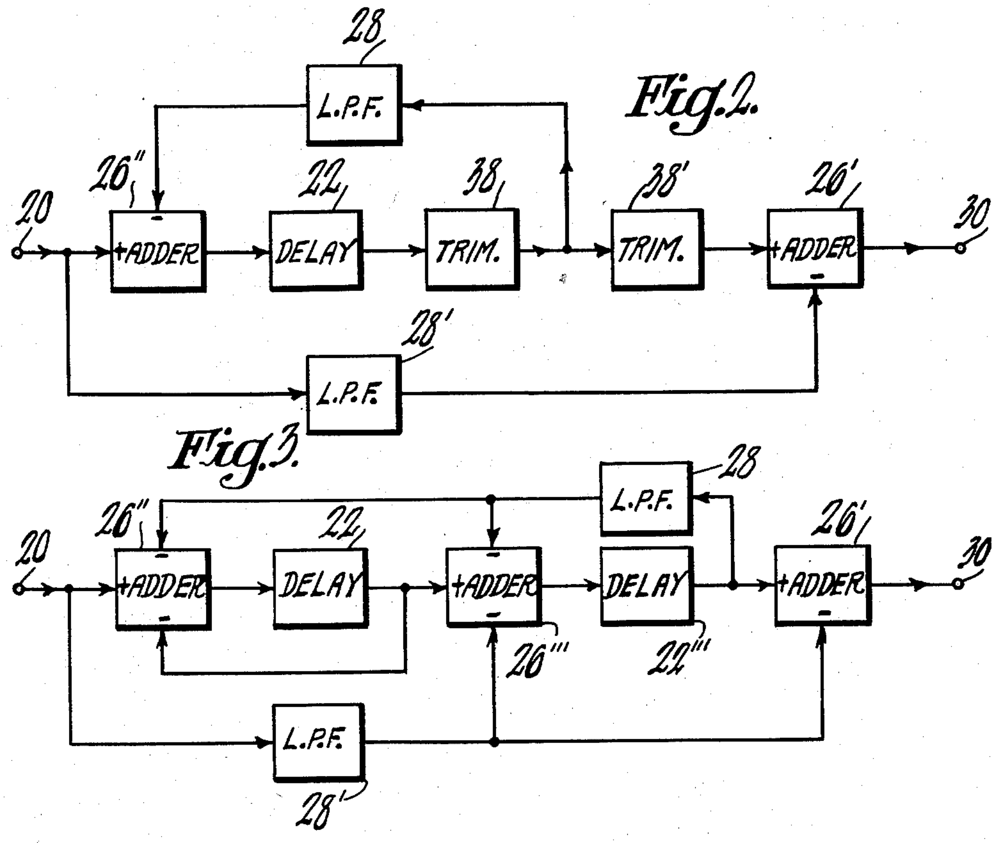
Figure 2 is a functional diagram of an embodiment of the invention.
Figure 3 is a functional diagram of a further embodiment of the invention.

A functional diagram of a signal compensating arrangement according to the invention requiring but a single time delay device for delaying the video signals is shown in Figure 2. The video signals appearing at the input terminals 20 are applied through an algebraic adding circuit 26'' to the input terminals of a time delay device 22, which in conjunction with a delay trimming device 38 as shown, is arranged to delay the video signal for a time substantially equal to that required to scan one line. The video signal delayed once constitutes the main signal corresponding to the line of the raster under consideration. A portion of the once delayed signal is applied, by way of a low pass filter 28 if horizontal peaking is also desired, to an input terminal of the initial algebraic adding circuit 26''. The algebraic adding circuit 26'', which may be in the same form as that shown in the above mentioned copending U.S. patent application, Serial No. 587,360, is arranged to attenuate and invert the polarity of the portion of the once delayed signal to form a combined signal for application to the input terminals of the time delay device 22. The resultant combined signal at the output of the time delay device 22 is the main signal already combined with a secondary signal of information corresponding to a portion of the information of the line of the raster in the same field preceding the line under consideration. The combined signal is applied through another trimming delay device 38' to an input of an output algebraic adding circuit 26'. A portion of the video signal appearing at the input terminals 20 is applied, through the intermediary of a low pass filter 28' if peaking in the horizontal direction is desired, to an input terminal of the output algebraic adding circuit 26' in such magnitude and polarity as to compensate in accordance with information appearing in the line succeeding the line under consideration thereby to produce a balanced compensated video signal at the output terminals 30. Vertical peaking on the leading edge of each transition is afforded by passing the video signals once through delay device 22 and peaking on the trailing edge of each transition is afforded by again passing the signals through the delay device 22.

The signal which appears at the output of the delay line 22 from whatever source is applied to the initial algebraic adding circuit 26'' for further traverse of the delay line 22, and so on, so that theoretically at least the signal keeps circulating the loop. In practice, however, relatively small amounts of peaking are employed so that the circulating signal dies out rapidly. In general, a compromise may be readily made between the degree of peaking and the amplitude of the circulating signal which would adversely affect the reproduced image.

The arrangement shown in Figure 3 may be used to further reduce the ringing effect and also to provide more perfect compensation. Essentially the circuit shown in Figure 3 comprises an additional circuitry for compensating the information for the line under consideration by introducing components of the information obtained from the lines in the same field of the raster which are two lines preceding and two lines succeeding the line under consideration, as well as combining information from the immediately preceding and immediately succeeding lines. As regards the main signal and the secondary signals the circuit arrangement of Figure 3 is essentially two compensating stages as shown in Figure 2 connected in cascade while for the tertiary signals the circuit is effectively a single stage having the delay device separated into two portions with a repeating device in the form of an algebraic adding circuit 26''' interposed therebetween. While the algebraic adding circuits 26', 26'' and 26''' are shown in the figure as arranged for subtracting the secondary and tertiary signals from the main signals, it should be understood that in some instances it may be desirable to add one or more of the secondary or tertiary signals, in which case signal inversion is not undertaken.

The ringing is lessened with the arrangement of Figure 3 because there are two loops available for the information comprising the secondary signals so that only half the correction is required in each loop. The circulating signal fed back across both delay lines 22, 22''' is adversely affected by the same ringing as is the circulating signal fed back by the one delay line 22. In general, however, the circulating signal resulting from the tertiary signals will not be as large as the circulating signals resulting from the secondary signals as less of the information obtained from the further distances from the line under consideration is required for proper compensation.

Circuitry for performing the invention outlined in the functional diagrams of Figures 2 and 3 may be the same as for performing the functions outlined in Figure 1 and if quartz crystal delay devices are employed those skilled in the art will readily determine the connections of the suggested generating, modulating and demodulating circuitry necessary. Specific examples of all of the circuitry necessary for performing the desired functions may be obtained by referring to the above mentioned copending U.S. patent application, Serial No. 587,360, and those skilled in the art will determine other circuitry suitable for the problem at hand.

The invention claimed is:

1. In a television system including a source of video signals and in which said video signals are to be impressed subsequently upon an image reproducing device in parallel lines, apparatus to compensate for loss of detail in a direction perpendicular to said lines, said apparatus comprising means coupled to said video signal source for delaying said signals for a time substantially equal to that required to scan one line, a signal combining circuit coupled to said video signal source and to the output of said signal delaying means for combining the delayed signal output of said delaying means and the undelayed signal output of said source in predetermined polarity and magnitude, and another signal combining circuit interposed between said video signal source and the input of said delaying means, said last named signal combining circuit having an input coupled to the output of said delaying circuit, having an input connected to said source and having an output connected to the input of said delaying circuit.

2. In a television system including a source of video signals and in which said video signals are to be impressed subsequently upon an image-reproducing device in parallel lines, apparatus to compensate for loss of detail in both the direction of said lines and a direction perpendicular to said lines, said apparatus comprising means coupled to said video signal source for delaying said signals for a time substantially equal to that required to scan one line, means coupled to said signal source for attenuating the higher frequency components of the undelayed signal, a signal combining circuit coupled to the output of said delaying means and to said attenuating means for combining delayed signal and the attenuated undelayed signal, and another signal combining circuit interposed between said video signal source and the input of said delaying means, said last named signal combining circuit having an input coupled to the output of said delaying means by other means for attenuating said higher frequency components of the delayed signal, having another input coupled to said source and having an output coupled to the input of said delaying means.

3. In a television system including a source of video signals and in which said video signals are to be impressed subsequently upon an image reproducing device in parallel lines, apparatus to compensate for loss of detail in a direction perpendicular to said lines, said apparatus comprising means coupled to said video signal source for delaying said signals for a time substantially equal to that required to scan one line, means coupled between the output and the input of said delaying means for causing said signals to traverse said delaying means an additional time, and means coupled to said video signal source and to the output of said signal delaying means for combining delayed and undelayed signals in predetermined polarity and magnitude to produce a compensated video signal for subsequent impression upon said image-reproducing device.

4. In a television system including a source of video signals and in which said video signals subsequently are to be impressed upon an image-reproducing device in parallel lines, apparatus to compensate for loss of detail in a direction perpendicular to said lines, said apparatus comprising means coupled to said video signal source for delaying said signals for a time substantially equal to that required to scan one line, means for applying the output of said delaying means to the input thereof in such polarity and magnitude that a portion of said output is subtracted from the video signal at the input of said delaying means whereby said portion is caused to traverse said delaying means an additional time, and means coupled to the output of said delaying means and to said source for combining said delayed and said undelayed signals in predetermined polarity and magnitude to produce a compensated video signal for subsequent impression upon said image-reproducing device.

5. In a television system including a source of video signals and in which said video signals are subsequently to be employed to reproduce an image in horizontal lines, apparatus to compensate for loss in detail in the vertical direction, said apparatus comprising means coupled to said video signal source for delaying said signals for a time substantially equal to that required to scan one line to form a main signal, means coupled to the output of said delaying means for attenuating the higher frequency portions of the delayed video signal from said delaying means, means coupled to said attenuating means and to said source for algebraically adding the attenuated and delayed signal to the undelayed signal to form a secondary signal and for causing said secondary signal to traverse said delaying means for an additional time, further means coupled to said source for attenuating the higher frequency portions of the undelayed signal to form another secondary signal, and means coupled to the output of said delaying means and to the output of said further attenuating means for adding the main and secondary signals to produce a compensated video signal for image reproduction.

6. In a television system including a source of video signals and in which said video signals are subsequently to be employed to reproduce an image in horizontal lines, apparatus to compensate for loss in detail in both the horizontal and vertical directions, said apparatus comprising means coupled to said video signal source for delaying said signals for a time substantially equal to that required to scan one line to form a main signal, a low pass filter coupled to the output of said delay means, means coupled to the output of said low pass filter and to said source for algebraically adding varying portions of said delayed video signal passed by said low pass filter to the undelayed signal to form a secondary signal, means coupled to said adding means for causing said secondary signal to traverse said delaying means for an additional time, means including a second low pass filter coupled to said source to form another secondary signal, further means coupled to said second low pass filter and to the output of said delaying means for algebraically adding the main and secondary signals to produce a compensated video signal for image reproduction.

7. In a television system in which signals including information representative of a subject are produced by effectively scanning said subject in substantially parallel raster lines and in which said signals are subsequently impressed upon an image-reproducing device operated in a manner to form an image raster of substantially parallel lines, apparatus to compensate for loss in detail in the direction of the lines and in a direction substantially perpendicular to said lines, said apparatus including means for delaying said signals for a time substantially equal to the time required to scan a line of said raster to form a main signal, means coupled to said source and including circuitry for attenuating only the higher frequencies of said signals for producing secondary signals, means coupled to the output of said delaying means and to the output of said secondary signal producing means for inverting said secondary signals and adding the same to said delayed signals, other means coupled to the output of said delaying means and including circuitry at least similar to said circuitry for producing secondary signals for producing further secondary signals, and means interposed between said source and the input of said delaying means and coupled to said further secondary signal producing means for adding the undelayed and further secondary signals and causing the same to traverse said delaying means an additional time thereby to produce a compensated subject representative signal for subsequent impression upon said reproducing device.

8. In apparatus to compensate for loss in detail in the vertical direction in a television system including a source of video signals by which to reproduce an image in parallel lines, a signal combining circuit coupled to said video signal source, a delaying circuit coupled to said combining circuit for delaying said signals for a time substantially equal to that required to scan one line, another combining circuit coupled to said delaying circuit, a circuit coupled between the output of said delaying circuit and the first said combining circuit for suppressing the higher frequency components of the delayed signal for subsequent application to said delaying circuit and to said other combining circuit, and another circuit connected between the input to the first said combining circuit and said other combining circuit for suppressing said higher frequency components of the undelayed signal thereby to produce at the output of said other combining circuit a compensated video signal for subsequent impression on an image reproducing device.

9. In a television system including a source of subject-representative signals and in which said signals are subsequently to be impressed upon an image-reproducing device operated in a manner to form an image raster of successive fields in interlaced substantially parallel lines, apparatus to compensate for loss in detail in a direction substantially perpendicular to said lines, said apparatus comprising, means coupled to said signal source for delaying said signals for a time substantially equal to the time elapsing between the scanning of a point in one of said raster lines and a substantially corresponding point in an adjacent line in the same field, means coupled to the output of said delaying means for suppressing the higher frequency components of said delayed signal, a signal inverting and combining circuit coupled to said signal source, to the input of said delaying means and to the output of said suppressing means for inverting and adding said delayed signal to said undelayed signal, other means coupled to said signal source for suppressing said higher frequency components of the undelayed signal, and a second signal inverting and combining circuit coupled to the output of said delaying means and to said other signal suppressing means for inverting and adding said undelayed signal to said delayed signal to produce a compensated subject-representative signal for subsequent impression upon said reproducing device.

10. An arrangement for compensation in a vertical picture direction in an interlaced scanning system comprising a first means for combining applied signals, a first delay line having a delay time of one television line time, a second means for combining applied signals, a second delay line having a delay time of one television line time and a third means for combining applied signals, means connecting said first signal combining means, said first delay line, said second signal combining means, said second delay line and said third signal combining means in cascade, means for applying television signals as an input to said first signal combining means, means connected to the output of said second delay line for deriving a main signal corresponding to a given line of the picture scene, means connected between the output of said first delay line and the first signal combining means for deriving a secondary signal corresponding to elements of one of a pair of scanning lines on one side of said given line in the same field, other means connected between the output of said second delay line and said first and said second signal combining means and between said video signal source and said second and said third signal combining means for deriving a secondary signal corresponding to elements of the other of a pair of scanning lines on the other side of said given line in the same field, and means comprising said cascade connecting means to combine the main signal and the secondary signals to derive a compensated signal.

References Cited in the file of this patent

UNITED STATES PATENTS

| | | |
|---|---|---|
| 2,757,236 | Bedford | July 31, 1956 |
| 2,759,044 | Oliver | Aug. 14, 1956 |
| 2,760,011 | Berry | Aug. 21, 1956 |